United States Patent [19]

Rambauske

[11] 3,805,052
[45] Apr. 16, 1974

[54] BEAM FORMING MIRROR APPARATUS
[75] Inventor: Werner R. Rambauske, Carlisle, Mass.
[73] Assignee: Raytheon Company, Lexington, Mass.
[22] Filed: July 2, 1973
[21] Appl. No.: 376,017

[52] U.S. Cl.... 240/41.35 C, 240/103 R, 240/51.22, 350/293, 350/299
[51] Int. Cl............................ F21v 7/14, G02b 5/10
[58] Field of Search.... 240/41 R, 41.35 R, 41.35 A, 240/41.35 C, 103 R, 51.12, 41.37; 350/293, 294, 299

[56] References Cited
UNITED STATES PATENTS

| | | | |
|---|---|---|---|
| 3,038,372 | 6/1962 | Lessman | 240/41.35 R X |
| 2,198,014 | 4/1940 | Ott | 350/293 X |
| 2,846,565 | 8/1958 | Binkley et al. | 240/41.35 R X |
| 2,787,701 | 4/1957 | Rosin | 240/41.35 R X |
| 1,679,108 | 7/1928 | Wood | 240/41.37 |
| 1,577,352 | 3/1926 | Caughlan | 240/41.37 |
| 3,453,425 | 7/1969 | Whitaker | 240/41.35 R X |

Primary Examiner—Joseph F. Peters, Jr.
Attorney, Agent, or Firm—Philip J. McFarland; Joseph D. Pannone

[57] ABSTRACT

A beam forming catoptric lens arrangement is disclosed in which an extended, or Lambertian, source of light is positioned in coincidence with a focal circle of a first "parellipsoidal" (meaning almost ellipsoidal) mirror and then directed toward a confocal mirror to form an emergent beam of desired shape. Also disclosed is a mirror arrangement to reflect light initially not directed toward the first parallipsoidal mirror through its focal circle to reflect off such mirror. Still further disclosed is a light baffle assembly in the path of light within the disclosed lens arrangement to permit only meridional rays and rays in planes nearly aligned with meridional planes to be present in the emergent beam.

4 Claims, 10 Drawing Figures

BEAM FORMING MIRROR APPARATUS

BACKGROUND OF THE INVENTION

This invention pertains generally to catoptric lens arrangements and particularly to arrangements of such nature adapted to compensate for achromatic aberrations, or the effects thereof.

It is well known in the art that the finite dimensions of any practical light source, when used with a catoptric lens arrangement to form a beam of light, give rise to various kinds of achromatic aberrations. That is, at least some of the reflected rays from any point on a mirror in such an arrangement lie in a different direction from the direction elementary ray theory would predict. In particular, if a beam forming catoptric lens arrangement incorporating curved mirrors having circular cross-sections is used, the finite dimensions of the associated light source give rise to aberrations of the type generally known as spherical aberration and coma. The particular kind of aberration, as is known, depends upon the location of the light source relative to the focal point, or points, of the mirrors in a beam forming arrangement. Thus, a source spaced from the focal point and on the axis of symmetry of a curved mirror, or lens axis, gives rise to spherical aberration; a source spaced from the focal point and the lens axis gives rise to coma. With mirrors having circular cross-sections, as those generated by rotating a portion of a quadratic conic section about an axis of symmetry, the magnitude of former aberration is, at any given cross-section, constant; at any given cross-section the magnitude of the latter varies from zero to a maximum dependent upon several known factors, including the dimensions of the source.

It is common practice in the art to reduce both spherical aberration and coma by providing a light source whose dimensions are as small as possible. Thus, it is known to use different types of arc lamps, in combination in some applications with an apertured plate, to simulate a point light source. With such an arrangement, the simulated source may be located almost exactly at a focal point of the entrance mirror. It is also common practice to reduce spherical aberration and coma by increasing the distance from a finite source to the reflection point on the entrance mirror. The greatest angle between a ray from the source and the line from the focal point to the reflection point is, as a result, as small as possible. The aberration in the reflected ray is, consequently, a minimum. It is also common practice to pass a partially collimated beam containing aberrant rays through a number of plates or light baffles, thereby eliminating or redirecting the aberrant rays. Still another approach is to pass a partially collimated beam through a refractive lens to redirect aberrant rays to a desired direction.

While known approaches to compensation for achromatic aberrations are, in many applications, satisfactory, in some important cases sufficient compensation is almost impossible to attain; for example, in the design of an ordinary headlamp for automobiles.

The problem of reducing aberrations to an acceptable level in an automobile headlamp is complicated by the requirement that a single source and catoptric lens arrangement must provide different kinds of lighting. That is, although one function of the headlamp is to provide a well-collimated beam to illuminate the roadway ahead of the automobile, light must also be provided to illuminate areas on either side of the roadway. At the same time, however, it is essential that stray, or misdirected, light be reduced to a minimum to prevent glare in the eye of a motorist in an approaching vehicle or, by reason of reflection from the rear view mirror in a vehicle traveling in the same direction, glare in the eye of the motorist in a vehicle ahead.

Unfortunately, with automobile headlamps now used, the various conflicting requirements may not be met simultaneously. As a result, it is necessary to provide so-called "high" and "low" headlamps to permit the operator of an automobile selectively to change the beam according to driving conditions. As every motorist knows, such control, if left to a careless operator, often means that approaching motorists are blinded. Such a problem will become even more acute in the future if, as is now contemplated, a third headlamp is installed in an automobile to form a beam for illuminating the roadway at relatively longer distances than possible with presently used "high" beams. Another problem is that, for each headlamp, only a single incandescent filament may conveniently be used. Obviously, if such a filament burns out, the headlamp is utterly useless. It has been proposed that the beam of an automobile headlamp be steerable with respect to the automobile on which it is mounted. To accomplish such an end, without degradation of the beam, the relative positions of the light source and mirror in a conventional headlamp must be maintained constant.

The basic reason for the foregoing and other problems of known automobile headlamps is that, with a conventional paraboloidal mirror illuminated by an incandescent source of finite dimensions, spherical aberration and coma become appreciable, preventing formation of a beam of desired shape. To reduce the effects of such aberrations so that the beam may be shaped as required, light reflected from the paraboloidal mirror and light emanating directly from the incandescent source are passed through a complex refractive lens. Because the apparent origin of the light reflected from the paraboloidal mirror is not the same as the actual source, it is apparent that the elements of the complex refractive lens cannot be perfectly shaped or positioned to direct both the reflected and unreflected light. It follows, therefore, the "trade-offs" in the design of the elements of the complex refractive lens are necessary to reduce the aberration of the finally produced beam to an acceptable level. Even so, however, it is necessary to maintain the relative positions of the incandescent filament, the paraboloidal mirror and the complex refractive lens within close limits by assembling those elements into a unitary structure as the familiar "sealed-beam." Such an assembly must be replaced in toto if the incandescent filament burns out and, further, militates against steering the beam as the automobile is operated.

SUMMARY OF THE INVENTION

Therefore, it is a primary object of this invention to provide an improved beam forming catoptric lens arrangement operative with a light source of finite dimensions to provide a beam of light which may be shaped as desired.

Another object of this invention is to provide an improved beam forming catoptric lens arrangement operative with any, or all of a plurality of light sources of finite dimensions to provide a beam of light which may be shaped as desired.

Another object of this invention is to provide an improved beam forming catoptric lens arrangement operative with any, or all, of a plurality of light sources of finite dimensions to provide a beam of light which may be collimated to any desired degree by reducing spherical aberration and coma.

Still another object of this invention is to provide an improved catoptric lens arrangement operative with any selected number of light sources whose intensity may be controlled as desired to change the luminous flux density of the light in a single beam, or a number of beams.

Still another object of this invention is to provide an improved catoptric lens arrangement adapted to produce, from the light emanating from one or more extended light sources, a composite beam of light, the shape of such beam being adjustable as desired.

These and other objects of this invention are attained generally by providing, in combination, at least one light source having finite dimensions and a catoptric lens arrangement, the latter including at least a pair of confocal mirrors, each having a reflecting surface with an infinite number of image or focal points on a line spaced from an axis of symmetry of the catoptric lens arrangement; each such mirror sometimes being referred to hereinafter as a "Rambauske" mirror, thereby differing from a conventional mirror which has one, or two, image or focal points on an axis of symmetry.

BRIEF DESCRIPTION OF THE DRAWINGS

For a more complete understanding of this invention reference is now made to the following detailed description of various embodiments illustrated in the accompanying drawings in which.

Before proceeding further, it should be noted that the Figures have been simplified the better to illustrate the manner in which the various Rambauske mirrors coact. Thus, for example, the mounting structure and power source for the ring source of light in each embodiment has not been shown. It is deemed obvious to one of skill in the art that conventional elements of such nature would be incorporated in a working model of any of the illustrated embodiments.

DESCRIPTION OF THE PREFERRED EMBODIMENTS

Figures 1, 1A, 1B:
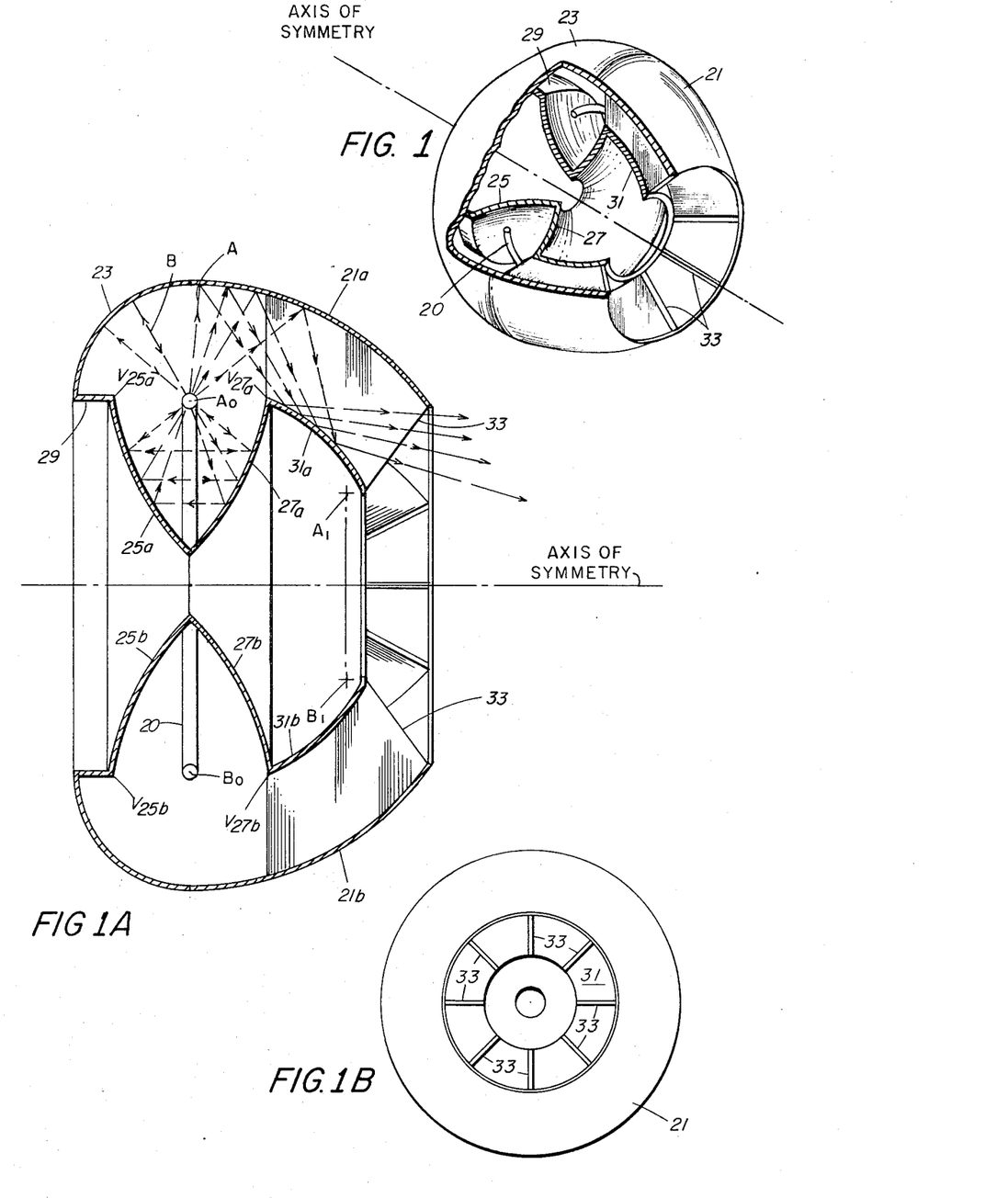
FIGS. 1, 1A and 1B, taken together, show an arrangement in which light from a ring source, as a fluorescent lamp, may be collimated in a single beam.

Referring now to FIGS. 1 and 1A it may be seen that a ring source 20 of light, as a fluorescent lamp, is positioned to correspond with a focal circle of a Rambauske mirror, here a parellipsoidal mirror 21. By "parellipsoidal" it is meant that the mirror may be considered to be almost ellipsoidal in that it possesses two focal circles rather than two focal points. As is shown more clearly in FIG. 1A, any meridional cross-section of such a shape includes a portion of an ellipse 21a and a portion of an ellipse 21b, the focal points of such ellipses being respectively at the points marked $A_0$, $A_1$ and $B_0$, $B_1$. When these ellipses are rotated about an axis of symmetry as shown in FIGS. 1 and 1A the just mentioned points form circles around such axis.

The parellipsoidal mirror 21 is faired into a mirror 23, here a quadrant of a circular torus confocal with the focal circle $A_0$, $B_0$ of the parellipsoidal mirror 21. A mirror 25 and a mirror 27 (the meridional cross-sections of which are shown in FIG. 1A) being indicated at 25a, 25b, 27a, 27b as portions of two parabolas having their focal points at $A_0$, $B_0$ and vertices at $V_{25a}$, $V_{27a}$, $V_{25b}$, $V_{27b}$ are formed by rotating such portions about the axis of symmetry. A ring 29, preferably nonreflective, is disposed between the mirrors 23 and 25. A Rambauske mirror, here parellipsoidal mirror 31 having both of its focal circles confocal with the focal circles of the parellipsoidal mirror 21, completes the reflective portions of the contemplated catoptric lens arrangement. To complete the entire assembly a number of radial baffles 33 are disposed between the parellipsoidal mirrors 21 and 31. These baffles preferably are nonreflective.

Figure 2:
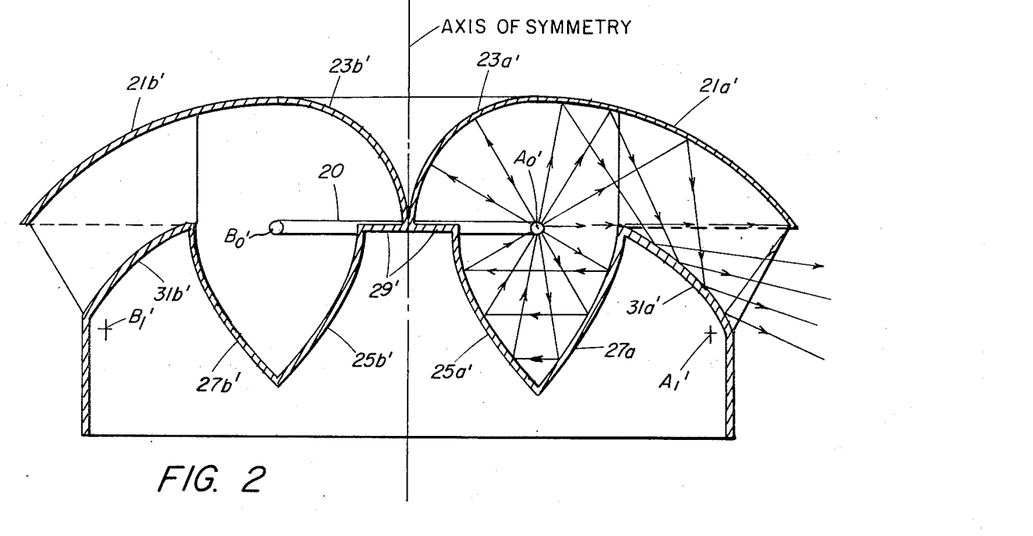
FIG. 2 is a cross-sectional view of an alternative embodiment of the arrangement shown in FIGS. 1, 1A and 1B.

Referring now to FIG. 2 it may be seen that the embodiment illustrated in FIGS. 1, 1A and 1B may be modified so long as confocality between the various mirrors is maintained. That is, although the position of the axis of symmetry is shown in FIG. 2 to have been changed to an orthogonal plane from that shown in the first embodiment, any intermediate position could have been taken.

In the embodiments shown in FIGS. 1, 1A, 1B and 2, light from any given point on the ring source 20 and in the meridional plane corresponding to the given point (meaning the plane defined by the given point and the axis of symmetry) ultimately reflects off the mirror 31 as though from a point on the focal circle $A_0 - B_0$. That is, regardless of the initial direction of any ray of light in a meridional plane, reflection as illustrated in FIGS. 1A and 2 by exemplary rays takes place. Thus, (1) any ray from point $A_0$ directly to the parellipsoidal mirror 21 is directed toward point $A_1$ but, before reaching that point, is reflected from mirror 31 so that the apparent origin of the twice-reflected ray is point $A_0$; (2) any ray directly to mirror 23 is reflected back on itself through point $A_0$ to mirror 23, from which it is reflected as described above in (2) to be, ultimately, reflected by mirror 31; and (4) any ray falling on mirror 27 is reflected to mirror 25 and thence through point $A_0$ to parellipsoidal mirror 21 and finally to mirror 31. It may be seen from the foregoing that any ray (except those few falling on the ends of the baffles 33) in any meridional plane passes out of the disclosed arrangement as a ray in a diverging beam apparently originating at a point; here, when all meridional rays are considered, the result is that the focal circle $A_0 - B_0$ is the apparent origin.

Nonmeridional rays from any point (meaning rays in a plane through a given point, but not containing the axis of symmetry) are also reflected by the various mirrors finally to be reflected by the mirror 31. Those rays falling directly on the parellipsoidal mirror 21 from the ring source 20 may, to some degree at least, be aberrant. That is, after reflection from the parellipsoidal mirror 21, such rays are not directed toward point $A_1$ but rather are directed toward a point (not shown) in the vicinity of $A_1$. It follows then that, after reflection from the mirror 31, such rays do not appear to have originated on the focal circle $A_o - B_o$, but rather from points adjacent such circle. Thus, such rays are aberrant; the amount of aberration suffered by any one of such rays being a function of the separation between the focal circle $A_o - B_o$ and the apparent origin of the ray. Further, because any ray lies in a plane defined by the normal to mirror 31 at the reflection point of such ray and the direction of the ray as it is incident on such point, any aberrant ray reflected from mirror 31 lies in a plane which does not contain the axis of symmetry. That is, aberrant rays lie in nonmeridional planes, i.e. planes which intersect the planes of the baffles 33.

It follows, then, that if the direction of a finally reflected ray from the mirror 31 deviates sufficiently from a desired norm, the ray will fall on a baffle 33. That is, "greatly" aberrant rays will be stopped by the baffles 33. The result then, depending upon the spacing and dimensions of the baffles 33, is that only nonaberrant and "slightly" aberrant rays, i.e. those rays which, after reflection from only the parellipsoidal mirror 21 and the mirror 31, appear to have originated on the focal circle $A_o - B_o$ or at a point near such circle, are left in the beam formed by the mirror 31 after such beam passes through the baffles 33.

Nonmeridional rays which are reflected between the mirrors 25, 27, i.e. all nonmeridional rays except those falling directly on the parellipsoidal mirror 21 and those falling on the line between the vertices $V25a$, $V25b$, $V27a$, $V27b$ are reflected around the channel (not numbered) formed by the opposing faces of the mirrors 25, 27 and, initially, toward the junction (not numbered) between the two. At each reflection point the plane in which the reflected ray lies is determined by the normal to the mirror, either 25 or 27, and the incident ray. Because the normal changes direction as the junction between the mirrors 25, 27 is approached, such plane changes. In other words, the "nonmeridional" plane in which the ray travels changes as the ray moves toward the junction of the mirrors 25, 27; when the "nonmeridional" plane coincides with a meridional plane, the ray is parallel to the vertices of the mirrors 25, 27 so it is then reflected out of the channel between the two as described hereinbefore. It follows then that originally "nonmeridional" rays reflected a number of times between the mirrors 25, 27 finally pass through the focal circle $A_o - B_o$ to the parellipsoidal mirror 21 and thence to a reflection point on the mirror 31. Such rays then appear in the beam finally produced as rays apparently originating on the focal circle $A_o - B_o$, or at points close to such circle. It follows, then, that any ray reflected back and forth between mirrors 25, 27 finally is reflected from the mirror 31 in a meridional plane or in a nonmeridional plane which is slightly angled with respect to a meridional plane. Relatively few, if any, of such rays will be intercepted by the broad sides of the baffles 33.

Figure 3:
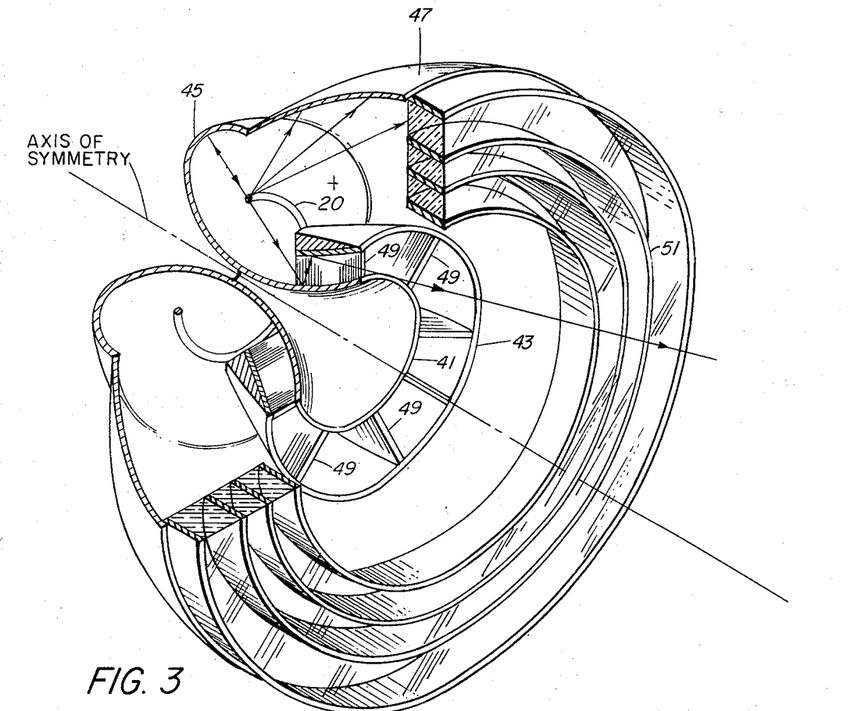
FIGS. 3, 3A and 3B, taken together, show an arrangement in which light from a ring source may be directed in a composite beam so that the intensity of the luminous flux in such a beam varies in a prescribed manner across any given cross-section.
Figure 3A:
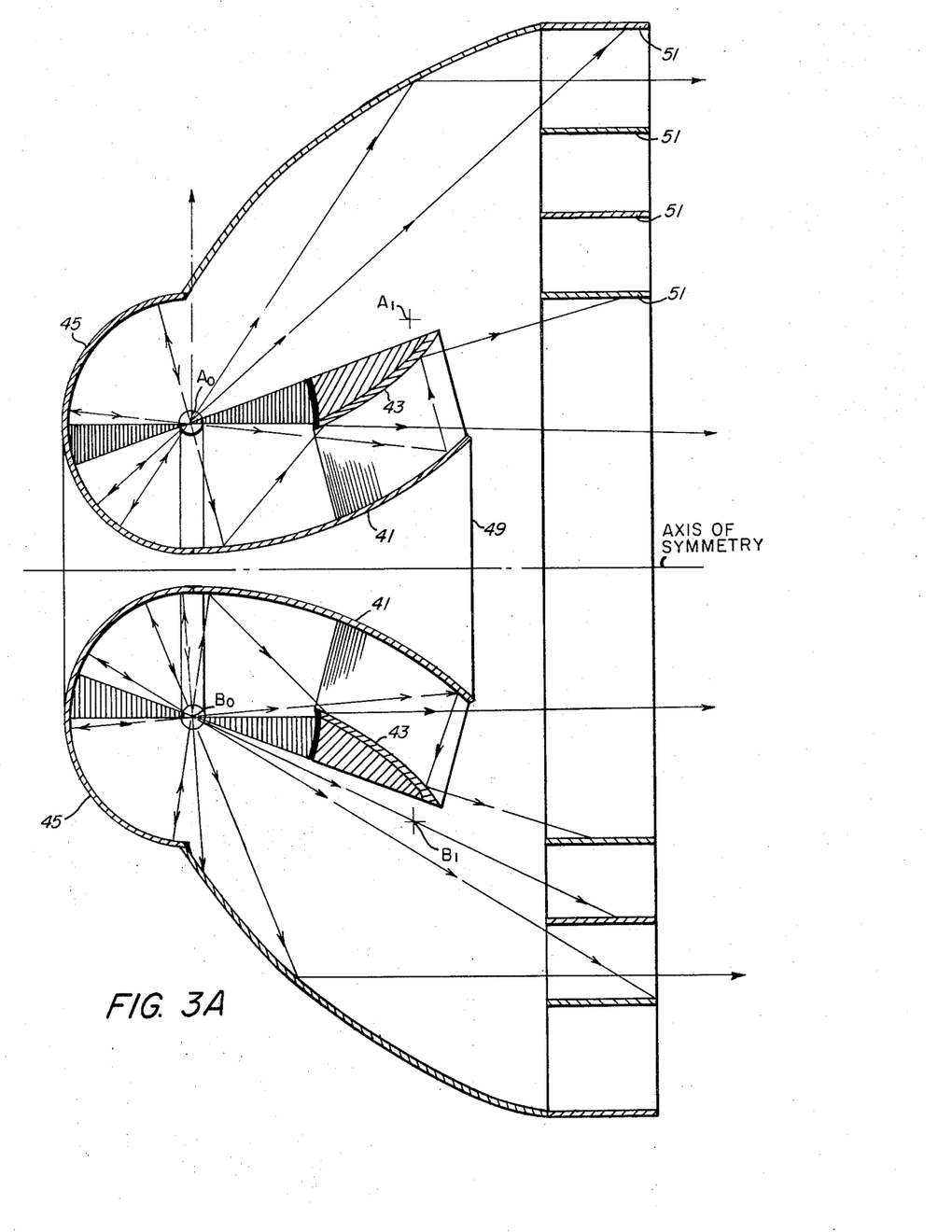
Figure 3B:
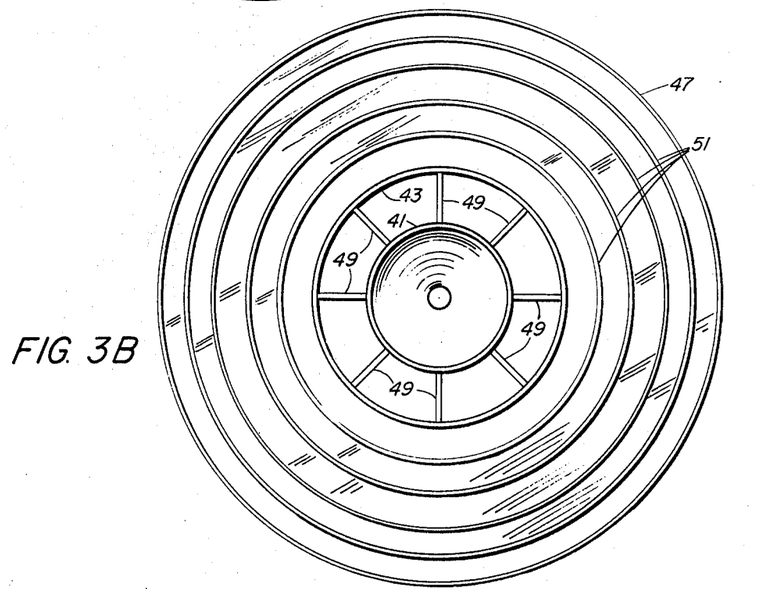

Referring now to FIGS. 3, 3A and 3B together, it may be seen that the principles of this invention may be modified so that a single catoptric lens arrangement may be used with a single ring source to produce a composite beam. Thus, a ring source 20 is disposed in coincidence with a focal circle $A_o - B_o$ of a pair of confocal Rambauske mirrors, here parellipsoidal mirrors 41, 43. A ring mirror 45, here one-half of a circular torus and also confocal with the focal circle $A_o - B_o$, is faired into the parellipsoidal mirror 41. Additionally, a beam forming mirror 47 (the reflecting surface of which corresponds to the surface formed by rotating a section of parabola about the axis of symmetry while maintaining the focal point of such curve in coincidence with the focal circle $A_o - B_o$) is disposed to intercept light from the ring source 20. A plurality of baffles 49, 51 are disposed in the path of the emergent light from the illustrated arrangement, the baffles 49 being radially disposed and the baffles 51 being circumferentially disposed.

In operation, light from the ring source 20 falling directly on the parellipsoidal mirror 41, along with light reflected from the opposite quadrant of mirror 45 is reflected toward parellipsoidal mirror 43, whence it is reflected as a divergent beam. The baffles 49 then intercept aberrant rays as described in connection with the previously described Figures. Light falling on the mirror 47, along with the light reflected to that mirror from the opposite quadrant of mirror 43, is formed into a beam containing aberrant rays. In this case, however, the aberrant rays are directed either toward the axis of symmetry or away from the axis of symmetry. The baffles 51 eliminate those aberrant rays having an abberation greater than desired.

Figure 4:
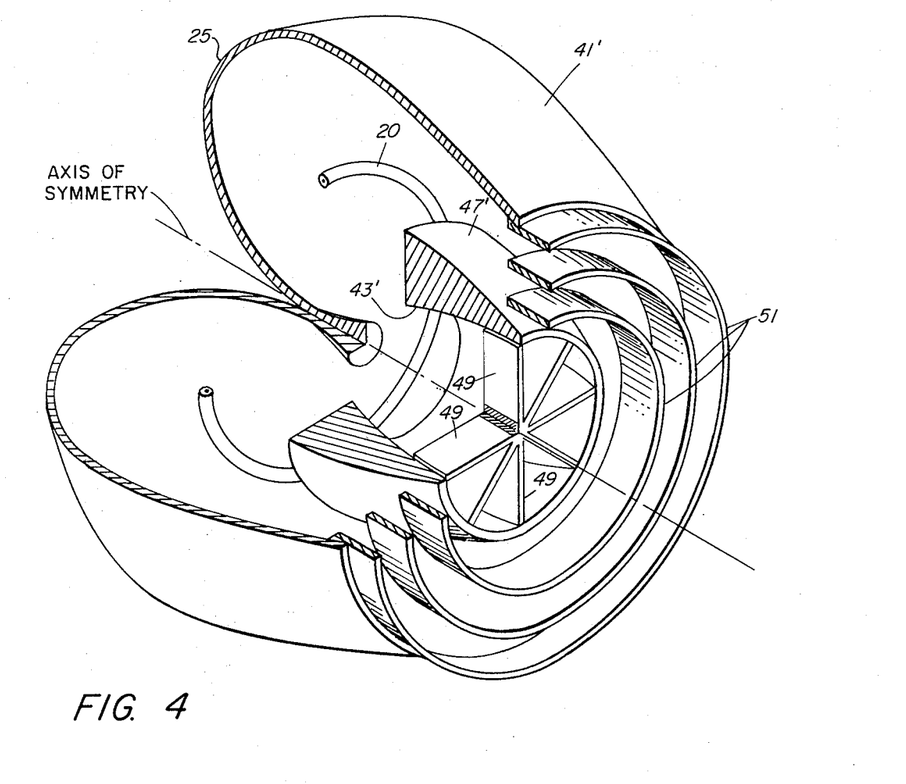
FIGS. 4, 4A and 4B, taken together, show an alternative arrangement to that illustrated in FIGS. 3, 3A and 3B.
Figure 4A:
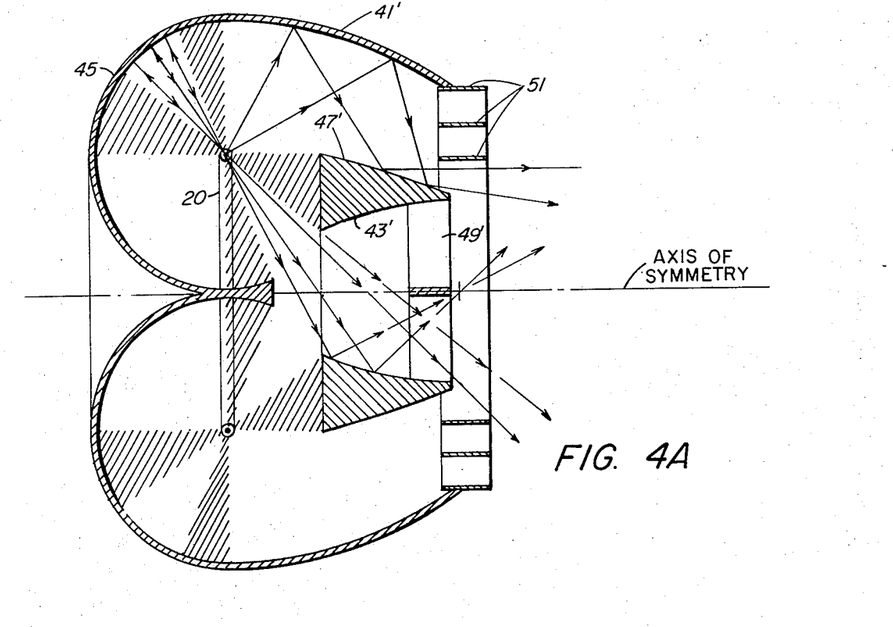
Figure 4B:
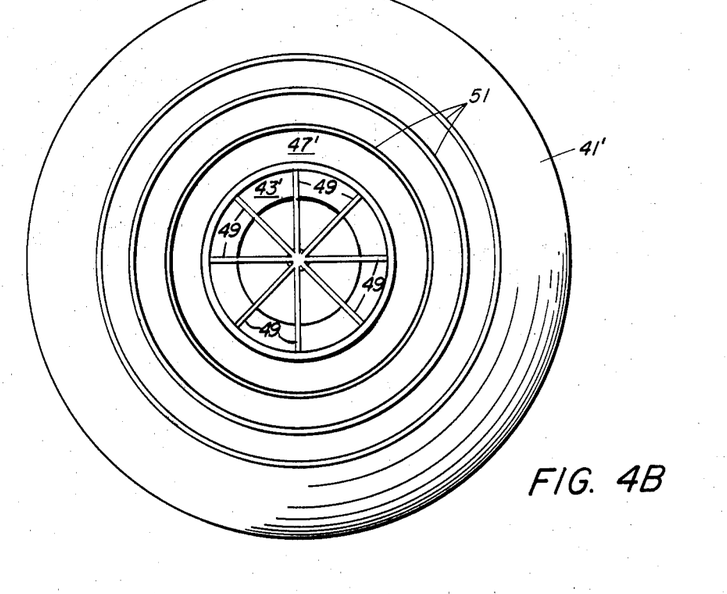

Referring now to FIGS. 4, 4A and 4B together, it may be seen that the embodiment illustrated in FIGS. 3, 3A and 3B may be modified to interchange the positions of the beam forming mirrors and to change their shapes to some degree. Thus, in FIG. 4, a ring source 20 is disposed in coincidence with a focal circle of a parellipsoidal mirror 41'. This mirror has a reflecting surface corresponding to the surface formed by nutating a portion of an ellipse about an axis of symmetry, one focal point of such generatrix being held at a point on such axis and the other focal point describing the focal circle. A paraboloidal mirror 47', here having a convex reflecting surface with a focal point coincident with the focal point of the parellipsoidal mirror 41' and an axis of symmetry coincident with the axis of symmetry of the disclosed arrangement, is disposed, as shown, to reflect light which is reflected off the surface of the parellipsoidal mirror 41'. Such reflected light, being convergent toward the focal point of the paraboloidal mirror 47', is reflected from the paraboloidal mirror 47' in a hollow beam substantially parallel to the axis of symmetry of the arrangement. In passing through the baffles 51, aberrant rays having directions deviating from the proper direction more than a desired degree impinge on the baffles and are eliminated.

Light from the source 20 is also reflected from a parellipsoidal mirror 43'. The latter is confocal with the parellipsoidal mirror 41'. The reflected light from parellipsoidal mirror 43' is, therefore, convergent in the area of the focal point on the axis of symmetry. After passing through such point a divergent beam is formed, with aberrant rays therein. Undesired aberrant rays in such divergent beam, in this case, impinge on baffles 49.

In connection with the embodiments shown in FIGS. 3, 3A, 3B and 4, 4A, 4B, it will be noted that different parts of the exit aperture of the illustrated beam forming arrangement contain different parts of the composite beam. Thus, in addition to the differently shaped baffles 49, 51 it is possible to place differently shaped refractive lenses in the path of the emergent beams if further correction is desired. Further, it will be noted that the size of the portion of the exit aperture used for each part of the composite beam may be changed relative to the other. Alternatively, the relative amounts of light passing through each portion of the exit aperture may be changed. In either case, the luminous flux in the different parts of the composite beam may be adjusted relative to each other.

It should also be noted that with all of the embodiments shown the ring source may be replaced by one, or more, incandescent lamps, with filament or filaments coinciding with the focal circle on which the ring source is placed. Still further, the number and shape of the baffles may be changed within wide limits, depending upon the desired degree to which aberrant rays are to be eliminated from the emergent beam.

What is claimed is:

1. A catoptric lens arrangement for forming a beam from wave propagated energy emitted by a ring source of such energy, such arrangement comprising:
   a. beam forming mirror means disposed about an axis of symmetry to intercept a first portion of the wave propagated energy from the ring source, such means including a first and a second mirror, each one thereof having a focal curve coincident with the centerline of the ring source; and
   b. mirror means disposed about the axis of symmetry to intercept the remaining portion of the wave propagated energy from the ring source and to reflect such remaining portion of wave propagated energy to the beam forming mirror means.

2. A catoptric lens arrangement as in claim 1 wherein the mirror means includes:
   a. a first concave ring mirrror, the cross-sectional shape of such mirror being a quadrant of a circle, the center of such circle tracing a curve coincident with the ring source, one edge of such mirror being contiguous with one side of the beam forming mirror means; and
   b. a second and a third concave ring mirror contiguous with each other, the cross-sectional shape of each being, respectively, a segment of a first and a second parabola, the focal point of the first and the second parabola tracing a curve coincident with the ring source, the second concave ring mirror being contiguous with the first concave ring mirror and the third concave ring mirror being contiguous with the beam forming mirror.

3. A catoptric lens arrangement as in claim 2 having additionally a plurality of planar baffles disposed within the beam forming mirror means, such baffles being radially disposed about the axis of symmetry.

4. A catoptric lens arrangement as in claim 3 wherein:
   a. the first mirror in the beam forming mirror means is a fourth concave ring mirror to intercept the wave propagated energy from the ring source; the cross-sectional shape of such mirror being a first ellipse; and
   b. the second mirror in the beam forming mirror means is a convex ring mirrow to intercept the wave propagated energy from the fist mirror, the cross-sectional shape of the second mirror being a second ellipse confocal with the first ellipse.

\* \* \* \* \*